US012787989B1

(12) United States Patent
Smart

(10) Patent No.: US 12,787,989 B1
(45) Date of Patent: Nov. 10, 2026

(54) HIGH-PERFORMANCE AQUARIUM VACUUM

(71) Applicant: JoAnna Smart, Huntsville, AR (US)

(72) Inventor: JoAnna Smart, Huntsville, AR (US)

( * ) Notice: Subject to any disclaimer, the term of this patent is extended or adjusted under 35 U.S.C. 154(b) by 393 days.

(21) Appl. No.: 18/517,728

(22) Filed: Nov. 22, 2023

(51) Int. Cl.
*A01K 63/04* (2006.01)

(52) U.S. Cl.
CPC .......... *A01K 63/045* (2013.01); *A01K 63/042* (2013.01)

(58) Field of Classification Search
CPC .. A01K 63/045; A01K 63/042; A01K 63/047; A01K 63/04; A01K 63/003; A01K 63/006; A01K 63/10; B01D 2201/204
See application file for complete search history.

(56) References Cited

U.S. PATENT DOCUMENTS 5,282,962 A * 2/1994 Chen .................... A01K 63/045 210/167.25
5,380,160 A * 1/1995 Chen .................... A01K 63/045 210/221.1
7,097,046 B2 8/2006 Calabrese
8,173,940 B2 5/2012 Wang
8,267,047 B2 9/2012 Tunze
8,268,179 B2 9/2012 Peters
8,534,229 B2 9/2013 Hudson
9,021,988 B2 5/2015 Turover et al.
9,363,985 B1 6/2016 Ford
10,004,210 B1 6/2018 Laz
2004/0018104 A1* 1/2004 Watkins ............... A01K 63/047 417/423.3
2015/0060340 A1* 3/2015 Liang ..................... A01K 63/06 210/232

FOREIGN PATENT DOCUMENTS

GB 2272944 A * 6/1994 ........... F04D 13/064

* cited by examiner

*Primary Examiner* — Trinh T Nguyen
(74) *Attorney, Agent, or Firm* — Cramer Patent & Design, PLLC.; Aaron R. Cramer

(57) ABSTRACT

A high-performance aquarium vacuum (HPAV) is an aquarium filtration/cleaning system with enhanced functionality. The device may be provided with a power cord connected motor housing unit. This provides the HPAV with the ability to remove waste and debris in the aquarium as well as clean sand substrate. A tube and hose from the HPAV may be detached from the motor housing unit leaving it behind to operate as a powerful wavemaker in aquariums of up to one-hundred-twenty-five gallons (125 gal.) The HPAV may also be provided with a three-stage filtration media, ensuring the water is as clean as possible before being returned to the aquarium, thus reducing the need for frequent water changes. For rapid water changing or tank emptying, the HPAV may be placed in a bucket to exchange water.

17 Claims, 5 Drawing Sheets

HIGH-PERFORMANCE AQUARIUM VACUUM

RELATED APPLICATIONS

Non-applicable.

FIELD OF THE INVENTION

The presently disclosed subject matter is directed to an aquarium vacuum and more specifically to an aquarium vacuum having enhanced features and performance.

BACKGROUND OF THE INVENTION

Keeping fish alive and healthy in an aquarium is a difficult and never-ending task, requiring a never-ending cycle of tasks revolving around the care and preservation of the aquatic environment to ensure the fish's well-being. It entails not only nourishment but also the ongoing maintenance of the aquarium, which requires meticulous attention to detail. Even with the assistance of continuously operating filtration systems that contribute to sustaining water cleanliness, virtually all aquariums require periodic thorough and exhaustive cleaning procedures.

The essence of this thorough cleaning procedure extends beyond the routine duties of water replacement and superficial surface cleaning. Rather, it entails the complex task of emptying the entire aquarium, scrubbing its interior surfaces thoroughly, and, in some cases, meticulously cleaning the internal components of the aquarium apparatus, including the delicate sand substrates. These responsibilities are essential for sustaining a healthy aquatic ecosystem, but they present formidable obstacles.

As one begins the process of maintaining an aquarium, a glaring problem becomes apparent: the majority of standard aquarium pumps, which are commonly found in hobbyists' setups, are ill-equipped to handle the volume of water required for these essential cleaning operations. Typically, these pumps lack the required power and accuracy to swiftly move large volumes of water while concurrently ensuring effective cleaning of the water column and the intricate sand substrates.

Consequently, there is a compelling unmet need in the field of aquarium maintenance: the need for an innovative solution that can revolutionize these essential cleaning duties. This solution must also address the challenges posed by traditional cleaning's time-consuming procedures, inadequate pump capabilities, and inefficiency. The development of the high-performance aquarium vacuum solves the aforementioned problems and satisfies this need in a safe, efficient, and cost-effective manner.

SUMMARY OF THE INVENTION

The present invention provides for a high-performance aquarium vacuum (HPAV) including a power head including a motor within a motor housing unit. Embodiments may also include an impellor section. In some embodiments, the HPAV may be configured to provide enhanced filtration and cleaning of an interior environment of an aquarium.

In some embodiments, the HPAV may include a power cord configured to supply electric power to operate the motor housing unit. In some embodiments, the power head may be securely mounted to a mounting bracket made of impact-resistant plastic for attachment to a smooth vertical surface within the aquarium. In some embodiments, the mounting bracket may be held in place on the aquarium by a trio of suction cups, each individual suction cup of the trio of suction cups may be respectively equipped with a removal tab for easy removal of the HPAV.

In some embodiments, the HPAV may include an intake hose and a discharge hose configured to provide a draining, a filling, and a cleaning functions in the interior environment of an aquarium. In some embodiments, the intake hose may be configured to input water into the power head while the discharge hose may be configured to provide an output for a quantity of pressurized water after the quantity of pressurized water passes through the impellor section.

In some embodiments, the intake hose and the discharge hose may be detachable, thereby enabling the power head to operate as a standalone wave maker for interior environment of an aquarium. In some embodiments, the HPAV may include a discharge filter connected to a distal end of the discharge hose including a tube/hose connector configured to provide a friction fit. Embodiments may also include a clear plastic vacuum tube having a vacuum opening containing a 3-stage. Embodiments may also include filtration media.

In some embodiments, the HPAV may include a stand configured to support the power head. Embodiments may also include a sidewall attachment to secure the power head and the mounting bracket on the interior environment of the aquarium. In some embodiments, the HPAV may be configured to facilitate a quick exchange of a quantity of water within the interior environment of the aquarium.

In some embodiments, the HPAV may be configured to safely operate with the interior environment of the aquarium having at least one aquatic plant. In some embodiments, the HPAV may be adaptable for emptying the interior environment of the aquarium by a placement of the power head in fluid communication with a first water source or a secondary water source while directing the discharge hose to facilitate drainage of the interior environment of the aquarium.

In some embodiments, the power head may be configured to provide enhanced filtration and cleaning of the interior environment of the aquarium with minimal disturbance to aquatic life within the interior environment of the aquarium. In some embodiments, the HPAV may include a compact and space-efficient design facilitating easy installation and operation in various aquarium sizes and configurations.

In some embodiments, the HPAV may be constructed with a durable and corrosion-resistant material. In some embodiments, the HPAV may include a safety mechanism to prevent accidental detachment of the mounting bracket from a wall of the interior environment of the aquarium. In some embodiments, the HPAV may include a user-friendly control and an interface. In some embodiments, the HPAV may be configured to offer improved water quality of the interior environment of the aquarium and reduced maintenance time of the aquarium.

Embodiments of the present disclosure may also include a high-performance aquarium vacuum (HPAV) including a suction strainer in place of a discharge hose. Embodiments may also include a fully rotational output in place of an intake hose. In some embodiments, the HPAV may be configured for oxygenating a quantity of water in an interior environment of an aquarium. In some embodiments, the HPAV may include a plurality of tubing attached to the fully rotational output. Embodiments may also include an adjustable aerator fitting attached to a distal side of the plurality of tubing.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
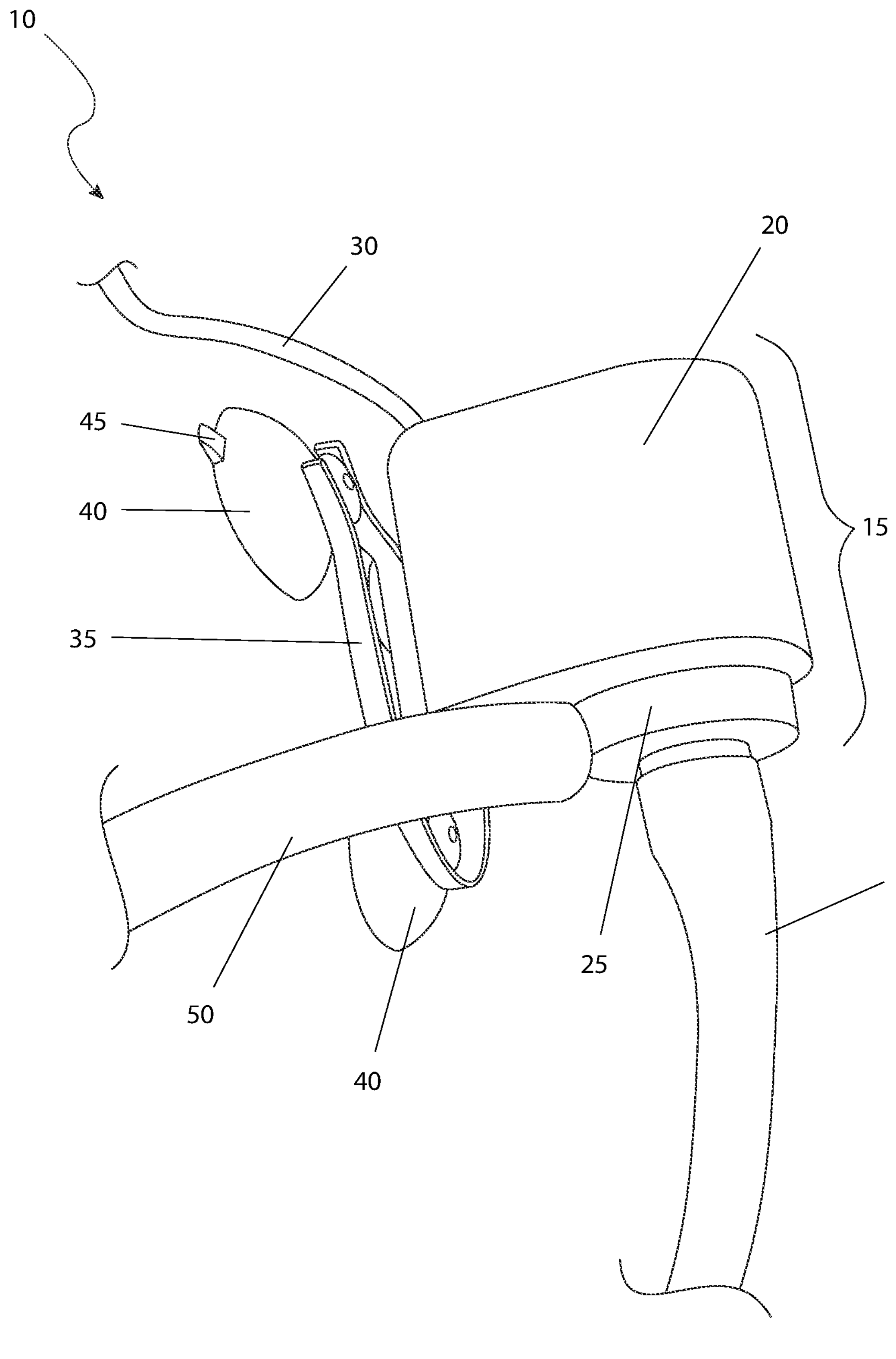
FIG. 1 is a perspective view of the side of a high-performance aquarium vacuum 10, according to the preferred embodiment of the present device.

10 high-performance aquarium vacuum
15 power head
20 motor housing unit
25 impellor section
30 power cord
35 mounting bracket
40 suction cup
45 removal tab
50 intake hose
55 discharge hose
60 suction strainer
65 fully rotational output
70 tubing
75 adjustable aerator fitting
80 discharge filter
85 tube/hose connector
90 vacuum tube
95 vacuum opening
100 3-stage filtration media
105 aquarium
110 stand
115 sidewall
120 water source
121 secondary water source
125 sand substrate

DESCRIPTION OF THE PREFERRED EMBODIMENTS

The best mode for carrying out the device is presented in terms of its preferred embodiment, herein depicted within FIGS. 1 through 5. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms “a” and “an” herein do not denote a limitation of quantity, but rather denote the presence of at least one (1) of the referenced items.

1. Detailed Description of the Figures

Referring now to FIG. 1, a perspective view of a side of a high-performance aquarium vacuum 10, according to the preferred embodiment of the present device is disclosed. The high-performance aquarium vacuum 10, provides, to an aquarium 105, a filtration/cleaning system with enhanced functionality. The high-performance aquarium vacuum 10 provides three (3) different functions: draining, filling, and cleaning. The high-performance aquarium vacuum 10 provides for a power head 15 which contains a motor housing unit 20 housing a motor (not shown) and an impellor section 25 in an expected configuration. A power cord 30 provides electric power to operate the motor housing unit 20. The power head 15 is mounted to a mounting bracket 35, envisioned to be made of impact-resistant plastic. The mounting bracket 35 is held to the side of smooth vertical surface, such as the wall of aquarium 105, by three (3) suction cups 40 (of which only two (2) of which are visible in FIG. 1 due to illustrative limitations). Each of the suction cups 40 are equipped 195 with a removal tab 45 to facilitate removal of the high-performance aquarium vacuum 10.

Under a typical configuration, the high-performance aquarium vacuum 10 would be provided with an intake hose 50 and a discharge hose 55. The intake hose 50 is used to provide the input of water into the power head 15, while the discharge hose 55 serves as an output for the water after it is pressurized by the power head 15 due to the action of the impellor section 25. It is noted that the intake hose 50 and the discharge hose 55 can be detached, leaving the power head 15 behind in the aquarium 105 as a powerful wave maker for aquariums 105 up to one hundred twenty-five gallons (125 G) in total capacity.

Figure 2:
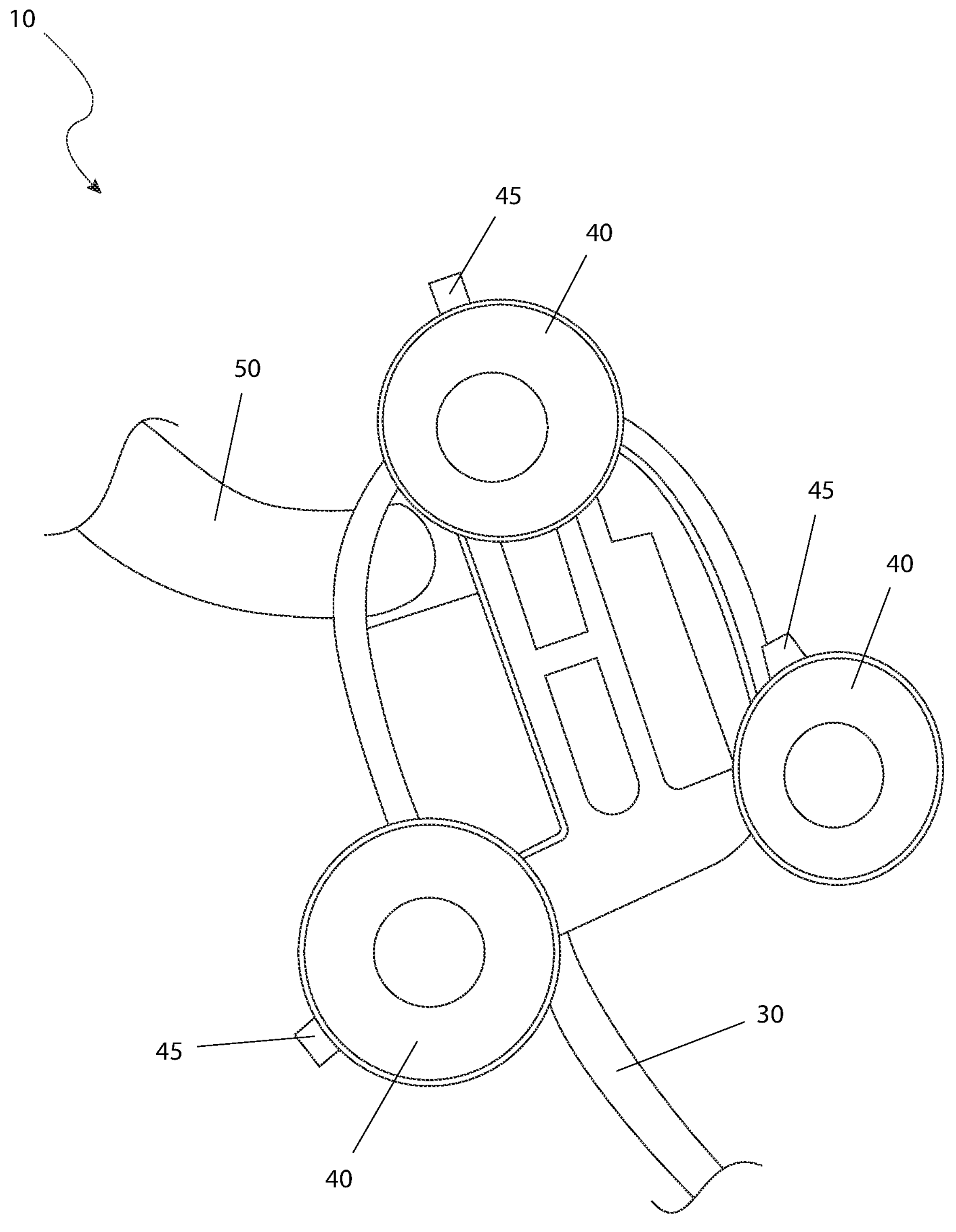
FIG. 2 is a perspective view of the rear of the high-performance aquarium vacuum 10, according to the preferred embodiment of the present device.

Referring next to FIG. 2, a perspective view of the rear of the high-performance aquarium vacuum 10, according to the preferred embodiment of the present device is depicted. This view provides additional clarity on the construction of the mounting bracket 35 and how it supports the motor housing unit 20 (as shown in FIG. 1). The three (3) suction cups 40 are visible along with their removal tab 45. The power cord 30 and the intake hose 50 remain visible on the distal side of the mounting bracket 35.

Figure 3:
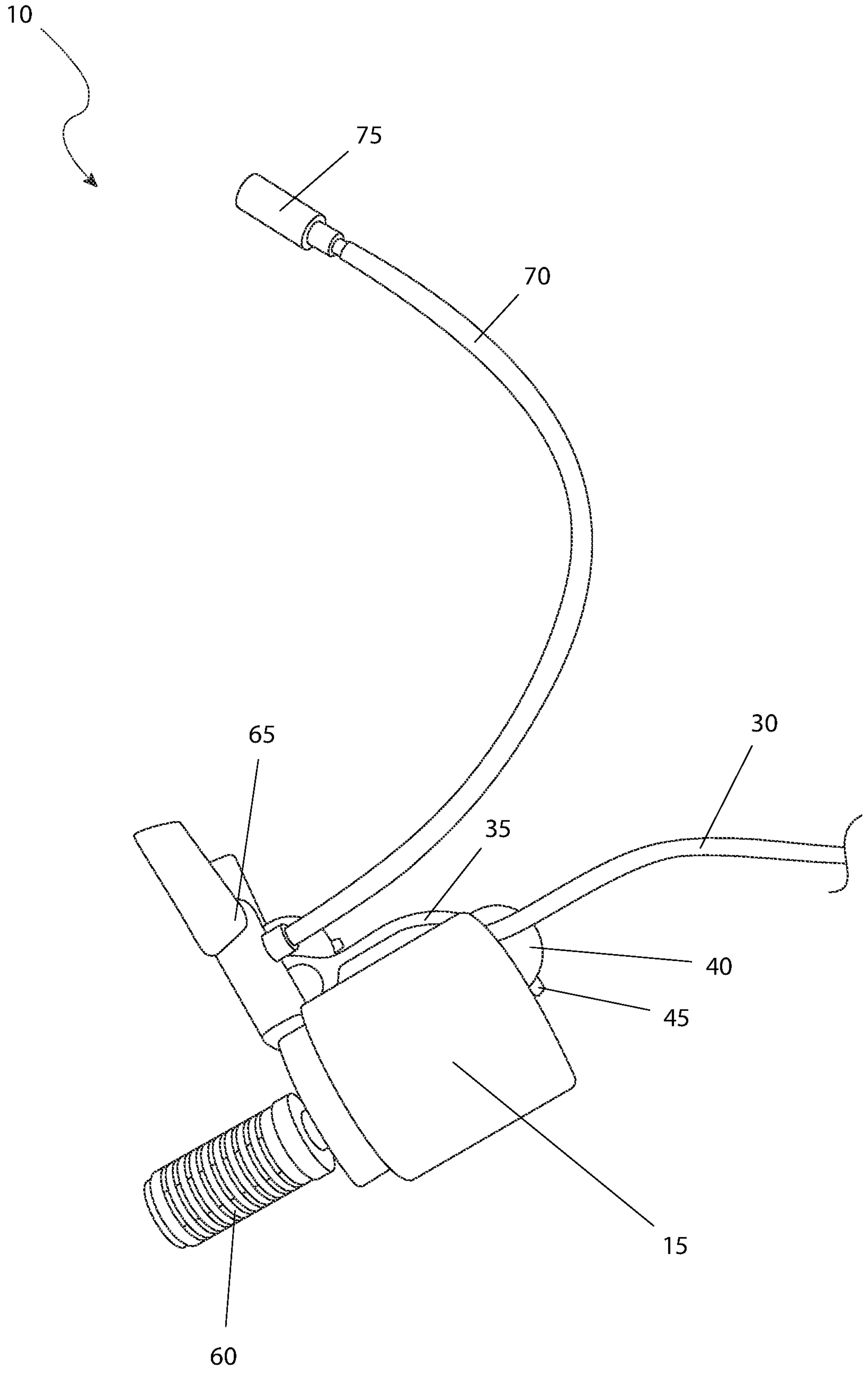
FIG. 3 is a perspective view of the high-performance aquarium 125 vacuum 10, according to an alternate embodiment of the present device.

Referring now to FIG. 3, a perspective view of the high-performance aquarium vacuum 10, according to an alternate embodiment of the present device is shown. In this alternate embodiment, the high-performance aquarium vacuum 10 is used primarily to oxygenate water in an aquarium 105. The discharge hose 55 (as shown in FIG. 1) is removed and is replaced with a suction strainer 60. The intake hose 50 (as shown in FIG. 1) is removed and replaced with a fully rotational output 65. Tubing 70, envisioned to be black in color and a small diameter, is then attached to the fully rotational output 65. An adjustable aerator fitting 75 is then attached to the distal side of the tubing 70. The mounting bracket 35, the suction cups 40 and the removal tab 45 remain attached to the power head 15, as powered by the power cord 30, to allow for attachment to the interior of the aquarium 105 on the sidewall glass, as aforementioned described. During use, the adjustable aerator fitting 75 is left above the waterline, thus allowing air to be pumped into the water and increasing the oxygen levels in the water.

Figure 4:
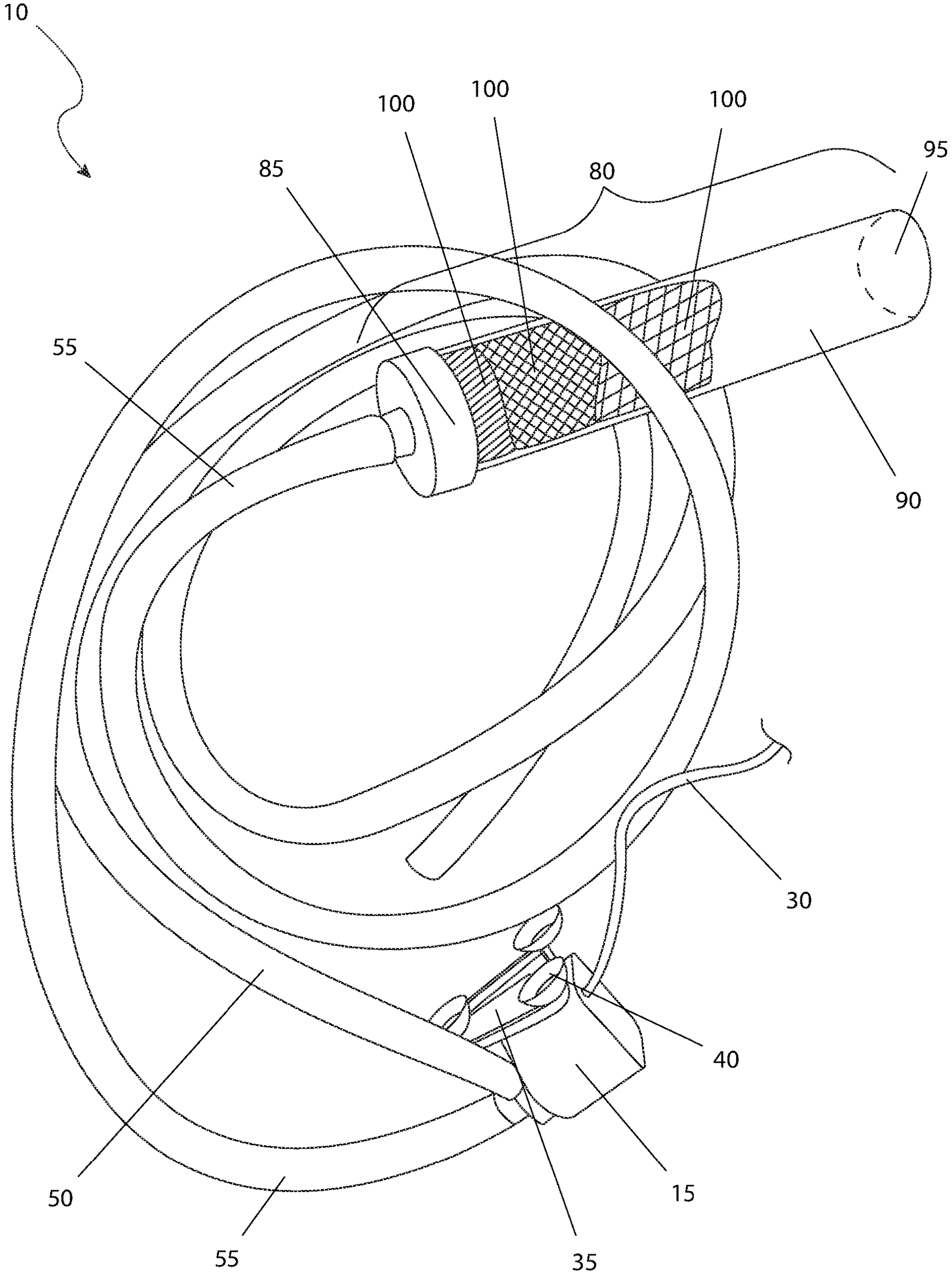
FIG. 4 is a perspective view of the high-performance aquarium vacuum 10, equipped with a discharge filter 80, according to the preferred embodiment of the present device; and, FIG. 5 is a perspective view of the high-performance aquarium vacuum 10, shown in a utilized state, according to the preferred embodiment of the present device.

Referring next to FIG. 4, a perspective view of the high-performance aquarium vacuum 10, equipped with a discharge filter 80, according to the preferred embodiment of the present device is disclosed. The intake hose 50 and the discharge hose 55 remain connected as described in FIG. 1. A discharge filter 80 is connected to the distal end of the discharge hose 55. The discharge filter 80 includes a tube/hose connector 85 which holds the discharge hose 55 in place via friction fit. The tube/hose connector 85 provides a physical pathway between the interior of the discharge hose 55 to a vacuum tube 90. The vacuum tube 90 is made of clear plastic with a vacuum opening 95 on the distal end. The interior of the vacuum tube 90 may be a 3-stage filtration media 100. Thus, during use, said discharge filter 80 ensures water is as clean as possible as it is being returned to the aquarium 105, thus reducing the need for frequent water changes. The power head 15 as powered by the power cord 30 and supported by the mounting bracket 35 wherein the suction cups 40 remain visible.

Figure 5:
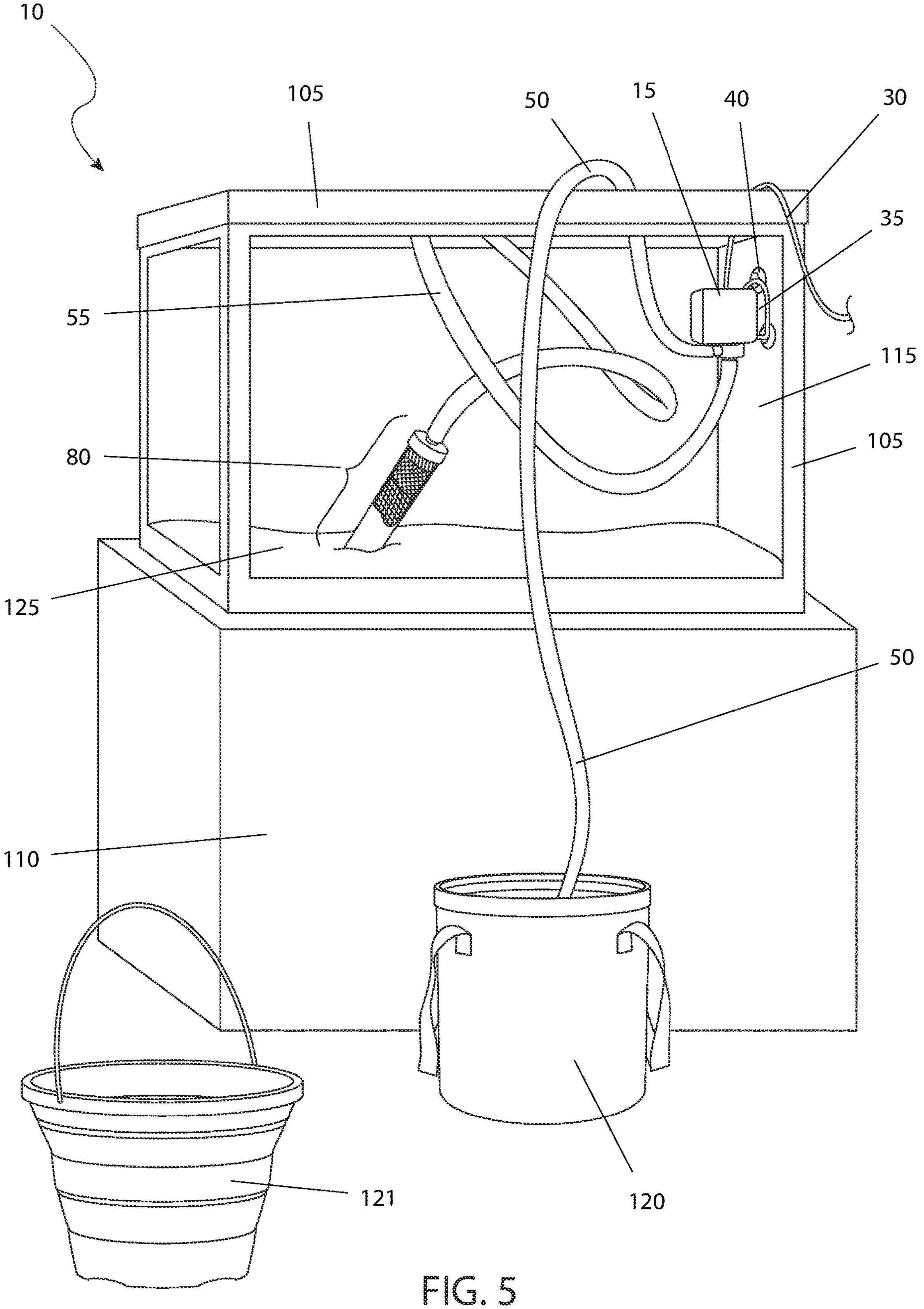

Referring to FIG. 5, a perspective view of the high-performance aquarium vacuum 10, shown in a utilized state, according to the preferred embodiment of the present device is depicted. The power head 15 may be placed upon a stand 110, as shown. The power head 15, along with the mounting bracket 35 and the suction cups 40, is attached to a sidewall 115 of the aquarium 105. The power cord 30, from the power head 15, is attached to a suitable power source. Water is obtained from a water source 120 and/or a secondary water source 121, such as a pan (as shown), a pail, tub, or the like, via the intake hose 50. It is then discharged into the aquarium 105 through the discharge filter 80 to ensure cleanliness. With the intake hose 50 and the discharge hose 55 placed in opposite positions. The high-performance aquarium vacuum 10 may be used to perform a fast water change in an aquarium 105. This functionality will allow cleaning of a sand substrate 125 (as shown) or gravel. The high-performance aquarium vacuum 10 is also envisioned to work with planted aquariums 105. Should emptying of the aquarium 105 be desired, the power head 15 may be located in a water source 120 or secondary water source 121, such as a pail or bucket. The distal end of the discharge hose 55 could then be placed such that it could drain into a sink, toilet, tub, grade, or other suitable location.

2. Operation of the Preferred Embodiment

The preferred embodiment of the present device can be utilized by the common user in a simple and effortless manner with little or no training. It is envisioned that the high-performance aquarium vacuum 10 would be constructed in general accordance with FIG. 1 through FIG. 5. The user would procure the high-performance aquarium vacuum 10 from conventional procurement channels such as marine stores, pet stores, mechanical supply houses, mail order and internet supply houses and the like. Special attention would be paid to various accessories, length of the intake hose 50 and discharge hose 55, and the like.

During utilization of the high-performance aquarium vacuum 10, it would be configured in one (1) of three (3) ways: a draining configuration, a filling configuration, and a cleaning configuration. In the draining configuration, the intake hose 50 and the discharge hose 55 would be attached to the power head 15 as shown in FIG. 1. The intake hose 50 would be placed in the aquarium 105 and the discharge hose 55 placed in a suitable waste water collection location such as tub, sink, toilet, grade or the like. The power cord 30 would be connected to a suitable source of power and the aquarium 105 allowed to empty. In the filling configuration, the intake hose 50 would be placed into a water source 120 and/or secondary water source 121, and the discharge hose 55 placed in the aquarium 105. The discharge filter 80 may be placed on the end of the discharge hose 55 if desired. The power cord 30 would be connected to a suitable source of power and the aquarium 105 allowed to fill. In the cleaning configuration, both the intake hose 50 and the discharge hose 55 would be placed in the aquarium 105 with the discharge filter 80 attached to the discharge hose 55. The power cord 30 would be connected to a suitable source of power and the aquarium 105 allowed to clean the water.

An additional use for the high-performance aquarium vacuum 10 includes oxygenation of the water in an aquarium 105. In such a configuration, the suction strainer 60 and the fully rotational output 65 are installed as shown in FIG. 3. An adjustable aerator fitting 75 is then attached to the distal side of the tubing 70. The high-performance aquarium vacuum 10 is located on the sidewall 115 of the aquarium 105 with the adjustable aerator fitting 75 left above the waterline, with the power cord 30, from the power head 15, attached to a suitable power source, thus allowing air to be pumped into the 290 water and increasing oxygen level of the water.

Another additional use for the high-performance aquarium vacuum 10 includes use as a wave maker for large aquarium 105. Such a configuration includes removal of the intake hose 50 and the discharge hose 55, leaving solely the power head 15, as attached by the mounting bracket 35 and the suction cups 40, behind in the aquarium as a powerful wave maker for aquariums 105 up to one hundred twenty-five gallons (125 G) in total capacity.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A high-performance aquarium vacuum (HPAV) comprising:
- a power head comprising:
- a motor within a motor housing unit;
- an impellor section;
- a discharge hose connecting to the impellor section; and
- a discharge filter connected to a distal end of the discharge hose comprising a tube/hose connector configured to provide a friction fit and a clear plastic vacuum tube having a vacuum opening containing a 3-stage filtration media; wherein the HPAV is configured to provide enhanced filtration and cleaning of an interior environment of an aquarium.

2. The HPAV of claim 1, further comprising a power cord configured to supply electric power to operate the motor housing unit.

3. The HPAV of claim 1, wherein the power head is securely mounted to a mounting bracket made of impact-resistant plastic for attachment to a smooth vertical surface within the aquarium.

4. The HPAV of claim 3, wherein the mounting bracket is held in place on the aquarium by a trio of suction cups, each individual suction cup of the trio of suction cups is respectively equipped with a removal tab for easy removal of the HPAV.

5. The HPAV of claim 1, further comprising an intake hose and a discharge hose configured to provide a draining, a filling, and a cleaning functions in the interior environment of an aquarium.

6. The HPAV of claim 5, wherein the intake hose is configured to input water into the power head while the discharge hose is configured to provide an output for a quantity of pressurized water after the quantity of pressurized water passes through the impellor section.

7. The HPAV of claim 5, wherein the intake hose and the discharge hose are detachable, thereby enabling the power head to operate as a standalone wave maker for interior environment of an aquarium.

8. The HPAV of claim 1, further comprising:

a stand configured to support the power head; and, a sidewall attachment to secure the power head and the mounting bracket on the interior environment of the aquarium.

9. The HPAV of claim 1, wherein said HPAV is configured to facilitate a quick exchange of a quantity of water within the interior environment of the aquarium.

10. The HPAV of claim 1, wherein said HPAV is configured to safely operate with the interior environment of the aquarium having at least one aquatic plant.

11. The HPAV of claim 1, wherein said HPAV is adaptable for emptying the interior environment of the aquarium by a placement of the power head in fluid communication with a first water source or a secondary water source while directing the discharge hose to facilitate drainage of the interior environment of the aquarium.

12. The HPAV of claim 1, wherein the power head is configured to provide enhanced filtration and cleaning of the interior environment of the aquarium with minimal disturbance to aquatic life within the interior environment of the aquarium.

13. The HPAV of claim 1, wherein the HPAV comprises a compact and space-efficient design facilitating easy installation and operation in various aquarium sizes and configurations.

14. The HPAV of claim 1, wherein the HPAV is constructed with a durable and a corrosion-resistant material.

15. The HPAV of claim 1, wherein the HPAV comprises a safety mechanism to prevent accidental detachment of the mounting bracket from a wall of the interior environment of the aquarium.

16. The HPAV of claim 1, wherein the HPAV comprises a user-friendly control and an interface.

17. The HPAV of claim 1, wherein the HPAV is configured to offer improved water quality of the interior environment of the aquarium and reduced maintenance time of the aquarium.

* * * * *